ized.

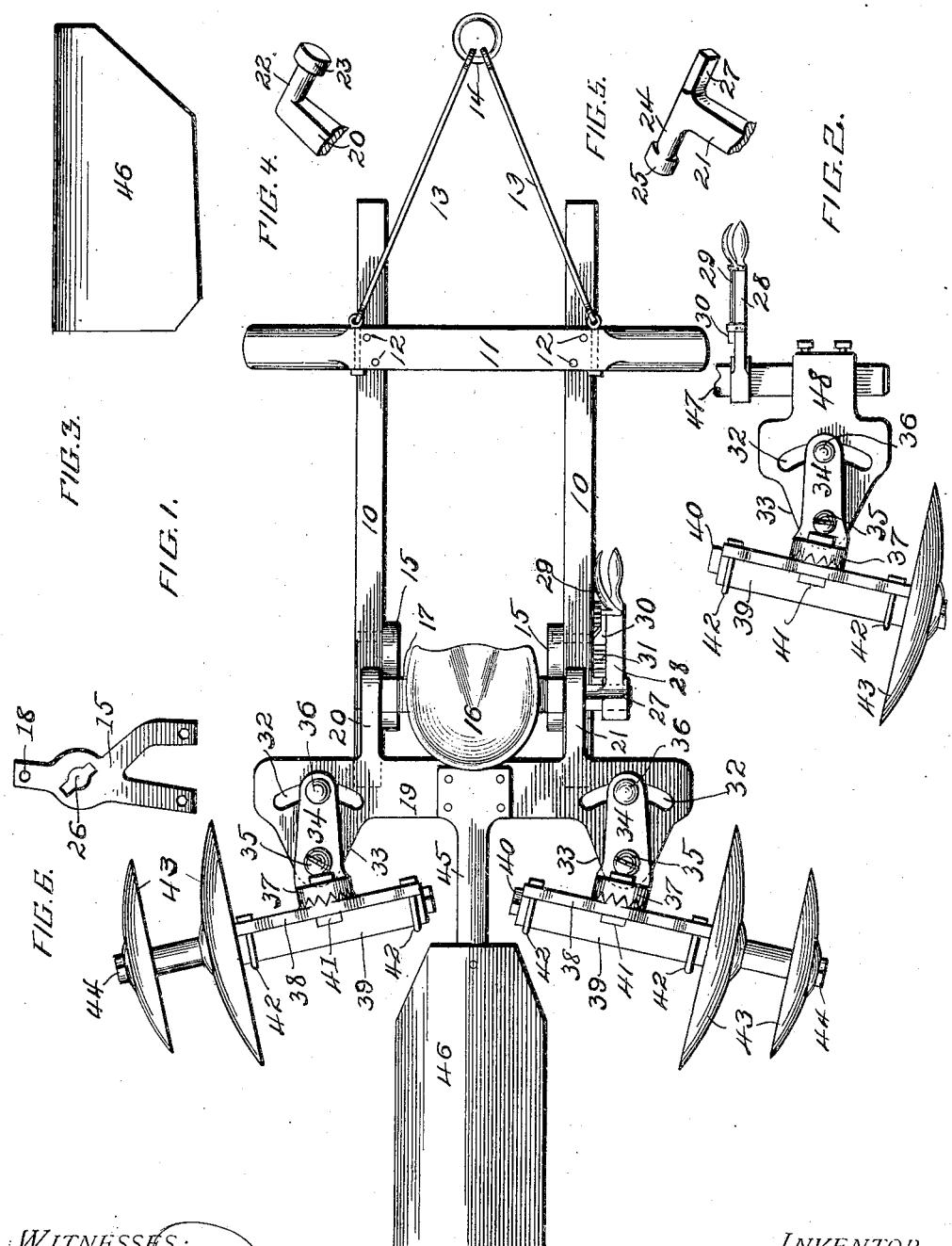

UNITED STATES PATENT OFFICE.

HENRY WILSHUSEN, OF STAFFORD, KANSAS.

LISTER-CULTIVATOR.

No. 898,162.    Specification of Letters Patent.    Patented Sept. 8, 1908.

Application filed May 12, 1908. Serial No. 432,343.

*To all whom it may concern:*

Be it known that I, HENRY WILSHUSEN, a citizen of the United States of America, residing at Stafford, in the county of Stafford and State of Kansas, have invented certain new and useful Improvements in Lister-Cultivators, of which the following is a specification, reference being had therein to the accompanying drawing.

This invention relates to certain new and useful improvements in lister cultivators, and more particularly to straddle-row cultivators, which are mounted upon a pair of parallel runners adapted to straddle a row of growing plants, and work the soil on each side of the plant.

The object of my invention is to provide a lister cultivator of improved construction having a series of disk-soil workers arranged laterally on each side of the outer surface of the runners.

A still further object of the invention is to provide a lister cultivator having improved means for raising and lowering the disks, improved means for adjusting the disks at an angle to the longitudinal plane of the runners, and also improved means for adjusting the disks at an angle to the vertical plane of the parallel runners.

Another object of the invention is to provide a lister cultivator having improved means for mounting the disks so that the latter may be positioned to throw the soil towards the growing plants, or away from the same as may be desired, and the invention still further aims to provide a device of this character having improved means for preventing the soil being thrown against the growing plants in a manner which would tend to break or injure the stalks thereof.

Finally the invention has for its object to provide a lister cultivator possessing advantages in points of simplicity, efficiency and durability, and at the same time to provide a cultivator of this type which will be comparatively inexpensive to manufacture.

With the above and other objects in view, the invention consists in the details of construction, and in the arrangement and combination of parts to be hereinafter more fully set forth, and then particularly pointed out in the claims.

In describing the invention in detail, reference will be had to the accompanying drawings forming a part of this application, wherein like numerals of reference will be employed to designate corresponding parts throughout the several views and in which:—

Figure 1 is a plan view of a cultivator constructed in accordance with my invention, Fig. 2 is a detail plan view of a portion of a cultivator showing a modified form of construction. Fig. 3 is a view in side elevation of the guard or plant protector detached from its support, Figs. 4 and 5 are detail perspective views of the trunnions which support the movable frame member of the device, and, Fig. 6 is a detail view in elevation of one of the frame and seat-supporting standards.

In the drawings, 10 indicates the parallel runners, which may be made of wood or any suitable material and which, obviously, when made of wood may be provided with metal shoes if desired. These runners are connected together near their forward ends by means of a cross piece 11 shown in the present instance as suitably secured to the upper face of the runners, as by bolts 12, to which cross piece the hitch is attached, and which may be of any desired form, that herein shown comprising a pair of links 13 attached at their inner ends to the cross piece, and connected at their outer ends by a ring 14, to which latter the double trees or single tree may be attached in any suitable manner.

Connected to the inner faces of the runners near the rear ends thereof, are standards 15 in which the movable frame which carries the soil disks is suitably trunnioned or journaled. These standards also serve as the support for the seat 16 mounted upon and fixedly secured to a seat bracket 17 having its ends bolted or riveted to the upper ends 18 of the standards 15.

In the preferred form of construction as illustrated in Figs. 1, 3, 4, 5, and 6, the soil working disks are connected to a frame member 19. This frame member extends transversely of the runners at the rear ends of the latter and is provided with forwardly-projecting arms 20 and 21 respectively. The arm 20 is provided at its forward end with an angularly-projecting trunnion 22 provided at its inner end with an elliptical-shaped head 23. Similarly, the arm 21 is provided with an angularly-projecting trunnion 24 provided at its inner end with an elliptical-shaped head 25. These trunnions 22 and 24 project inwardly from the arms 20, 21 and are journaled in the standards 15, the latter being provided with an opening 26, as seen in Fig. 6, which permits of the elliptical heads 23, 25 being passed through the standards. The arm 21 is provided with an extension 27 on which is mounted a lever 28 by means of which the frame 19 and the disks carried thereby is adjusted. This lever is provided with the usual form of locking rod 29 having a pawl or dog 30 to engage in the rack 31 carried on the outer face of one of the runners 10.

The frame member 19 is provided adjacent each end with a curved or segmental shaped slot 32, and also has rearwardly-projecting extensions 33. Brackets 34 are adjustably secured to the frame member 19, the flat portions of which brackets lie on the extensions 13 and are secured to the frame member by means of bolts 35 passing through the brackets and the extensions 33 and also by bolts 36 which pass through the slots 32. These brackets at their outer ends have an upwardly-extending portion 37, the outer face of which is provided with teeth, or is serrated to interlock with a toothed or serrated surface provided centrally of a plate 38, which plate carries the bearing box 39 for the disk-carrying axle 40. The toothed or serrated portion of the plate 38 is held in adjusted engagement with the toothed or serrated portion of the part 37 by means of a bolt 41 passing through said part 37 and the plate 38. The bearing box 39 may be secured to the plate 38 in any desirable manner as by clip bolts 42. The disk-carrying axle 15 is mounted in the bearing box 39 and is provided with the soil-working disks 43 spaced apart thereon and held on the axle in any suitable manner as by a nut 44. It is to be understood that of the parts above described one is located at each end of the frame plate 19.

To protect the plants from the dirt thrown inwardly towards the same by the soil working disks 43, I secure to the frame plate 19 centrally thereof a rearwardly-projecting bracket 45 to which is connected a guard or protector 46, the forward end of which is cut away in order not to interfere with the adjustment of the soil working disks.

In Fig. 2 of the drawings I have shown a slight modification in which instead of employing the forwardly-extending arms on the frame plate, I provide a shaft 47 which is journaled in the standards 15 and projects on each side of the runners 10. On the projecting ends of this shaft I secure frame plates 48 having the curved or segmental slots 32, and having the disk-carrying members secured thereto in the same manner as afore described.

From the foregoing description of the construction, it will be obvious that by pushing the lever 28, inwardly, the frame plate 19 will be elevated, consequently elevating the soil-working disks accordingly, and when the lever 28 is moved inwardly, the frame 19 and the soil disks will be correspondingly lowered. It will also be evident that by loosening bolts 35 and 36, the members 34 can be adjusted so as to adjust the disks at any desired angle to the longitudinal side surfaces of the runners, and also by loosening bolts 41, the soil-working disks may be adjusted with relation to the vertical plane of the runners. It will be obvious that the protector 46 may be dispensed with, if desired.

The construction, operation and advantage, will, it is thought, be understood from the foregoing description, and I would have it understood that although I have specifically described a preferred embodiment of the invention, that various changes may be made in the proportions and details of arrangement, without departing from the scope of the invention.

Having fully described my invention, what I claim as new and desire to secure by Letters Patent is:—

1. In a lister cultivator, a pair of runners spaced apart and having means for attaching the draft animals thereto, standards connected to said runners and projecting upwardly above the same and provided with bearings, a frame member provided with forwardly-extending arms having trunnions journaled in said bearings of the standards, an adjusting lever connected to one of said arms for adjusting the frame member, brackets adjustably secured to the frame member, bearing boxes adjustably secured to the brackets, disk-carrying axles journaled in said bearing boxes, and disks carried by said axles.

2. In a lister cultivator, a pair of runners spaced apart and having means for attaching the draft animals thereto, standards carried by said runners and projecting above the same, said standards provided intermediate their ends with bearings, a frame member hung from journals engaging in the bearings in said standards and having a segmental slot, a bracket pivotally mounted on the frame member and having a bolt extending through said slot, said bracket provided on its outer end with an upwardly extending portion provided with a toothed outer face, a plate provided intermediate its ends with a toothed portion engaging the toothed portion of the bracket, a bolt extending centrally through the toothed portion of said plate and through the upwardly extending toothed portion of the bracket for securing said plate to the bracket, and clip bolts carried by said plates at its ends, a bearing box carried by said clip bolts, a disk carrying axle journaled in the bearing box, disks rotatably mounted on said axle and an adjustable lever for holding the frame member in fixed position.

In testimony whereof I affix my signature in the presence of two witnesses.

HENRY WILSHUSEN.

Witnesses:
MARION WARREN,
F. L. HAGENMASTER.